(12) United States Patent
Palmer

(10) Patent No.: US 12,353,719 B2
(45) Date of Patent: Jul. 8, 2025

(54) THERMAL DUPLICATION OF DATA

(71) Applicant: Micron Technology, Inc., Boise, ID (US)

(72) Inventor: David Aaron Palmer, Boise, ID (US)

(73) Assignee: Micron Technology, Inc., Boise, ID (US)

(\*) Notice: Subject to any disclaimer, the term of this patent is extended or adjusted under 35 U.S.C. 154(b) by 0 days.

(21) Appl. No.: 18/421,287

(22) Filed: Jan. 24, 2024

(65) Prior Publication Data

US 2024/0264746 A1     Aug. 8, 2024

Related U.S. Application Data

(60) Provisional application No. 63/482,812, filed on Feb. 2, 2023.

(51) Int. Cl.
*G06F 3/06*     (2006.01)

(52) U.S. Cl.
CPC .......... *G06F 3/0611* (2013.01); *G06F 3/0653* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2016/0078907 A1* | 3/2016 | Woo | G06F 3/0619 711/162 |
| 2017/0255403 A1* | 9/2017 | Sharon | G06F 3/064 |
| 2020/0301602 A1* | 9/2020 | Kurosawa | G06F 3/0653 |
| 2021/0216472 A1* | 7/2021 | Ueda | G06F 11/3089 |

\* cited by examiner

*Primary Examiner* — Stephanie Wu
(74) *Attorney, Agent, or Firm* — Harrity & Harrity, LLP

(57) ABSTRACT

In some implementations, a memory device may detect that data is to be written for a set of temperature profiles. The memory device may write, at respective temperatures corresponding to the set of temperature profiles, multiple copies of the data. The memory device may receive, from a host device, a read request associated with the data. The memory device may detect, based on receiving the read request, a current temperature of the memory device. The memory device may read a copy, from the multiple copies, that is associated with a temperature profile, from the set of temperature profiles, that corresponds to the current temperature of the memory device. The memory device may provide, to the host device, the copy of the data.

20 Claims, 9 Drawing Sheets

THERMAL DUPLICATION OF DATA

CROSS REFERENCE TO RELATED APPLICATION

This Patent Application claims priority to U.S. Provisional Patent Application No. 63/482,812, filed on Feb. 2, 2023, and entitled "THERMAL DUPLICATION OF DATA." The disclosure of the prior Application is considered part of and is incorporated by reference into this Patent Application.

TECHNICAL FIELD

The present disclosure generally relates to memory devices, memory device operations, and, for example, to thermal duplication of data.

BACKGROUND

A non-volatile memory device, such as a negative-and (NAND) memory device, may use circuitry to enable electrically programming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

A memory cell, which may be referred to as a "cell" or a "data cell," of a non-volatile memory device may include a current path formed between a source and a drain on a semiconductor substrate. The memory cell may further include a floating gate and a control gate formed between insulating layers on the semiconductor substrate. A programming operation (sometimes called a write operation) of the memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A non-volatile memory device may include a plurality of page buffers connected between the bit lines and the column decoder. The column decoder is connected between the page buffer and data lines.

DETAILED DESCRIPTION

Figure 1:
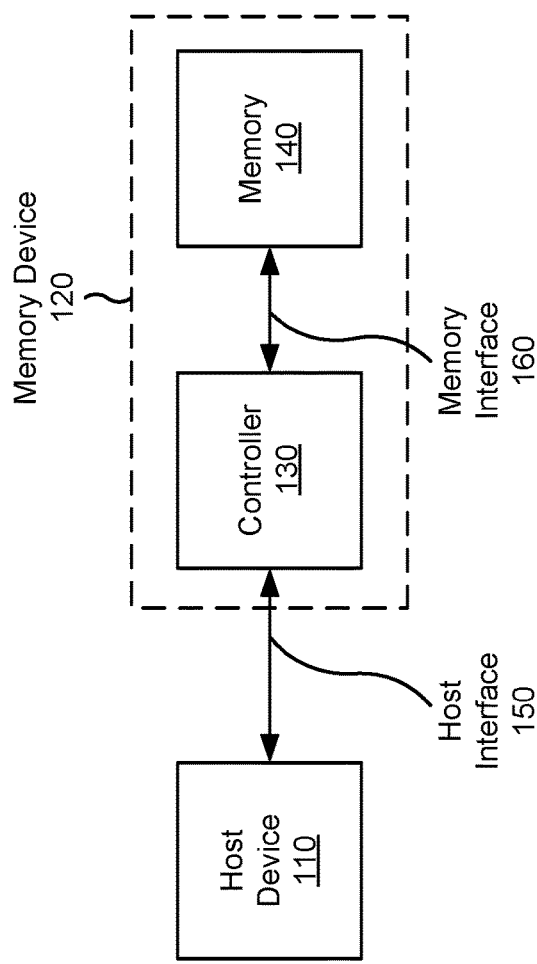
FIG. 1 is a diagram illustrating an example system capable of thermal duplication of data.

A memory device may utilize memory, including any combination of non-volatile memory arrays and/or volatile memory arrays, to store data. In some implementations, non-volatile memory devices can be provided by negative-and (NAND) type flash memory devices and/or solid state drives (SSDs). Other examples of non-volatile memory devices are described below in connection with FIG. 1. A non-volatile memory device is a package of one or more die. Each die may include one or more planes. Planes may be grouped into logic units. For some types of non-volatile memory devices (e.g., NAND devices), each plane may include a set of physical blocks. Each block may include a set of pages. Each page may include a set of memory cells (sometimes referred to herein as "cells"). A cell may be an electronic circuit that stores information.

Data operations may be performed by the non-volatile memory device. For example, the non-volatile memory device may receive access requests (e.g., a write command or a read command), such as to store data on a memory at the non-volatile memory device and/or to read data from the memory on the non-volatile memory device. The memory device may retain the stored data over time (e.g., over a life span of the memory device).

However, cross-temperature effects (e.g., write operations and read operations of the non-volatile memory devices occurring at different temperatures) can impact the reliability and/or the functionality of non-volatile memory devices. Cross-temperature effects may be associated with write operations and read operations occurring at different temperatures outside of a temperature threshold (e.g., a temperature range). Cross-temperature effects may result in a higher bit error rate at a controller of the memory device. For example, a NAND memory device works by trapping a charge in a cell (e.g., in a charge trap or floating gate) that then interferes with opening a channel by a control gate. The control gate read voltage is calibrated to be between two trapped charge states. Accordingly, if the channel opens (e.g., the control gate voltage can override the trapped charge) the cell has one value (e.g., a "1" in a single level cell (SLC)), and the cell has a different value if the channel does not open (e.g., a "0" in an SLC). Therefore, it is important that the trapped charge is calibrated with the read voltage. The calibration of the trapped charge and the read voltage is affected by temperature. Generally, the threshold voltage of a flash transistor changes with temperatures. A controller of the memory device can adjust the read voltage based on ambient temperature. The threshold voltage and the read voltage adjustment may not go hand in hand because there are many (e.g., several million) transistors in a memory device and there can be transistor-to-transistor differences with respect to the threshold voltage movement for temperature. Thus, programming (e.g., writing) at one temperature and reading at a different temperature may exacerbate margins. A typical result of writing at temperatures that are hot or cold is increased read errors. These read errors tend to diminish perceived performance of the device because error correction is performed during the read, resulting in greater latencies in the read-request and data delivery cycle. In other words, memory devices (e.g., NAND devices) experience higher raw bit error rates (RBERs) when there is a large difference between the temperature at which data is written and the temperature at which data is read.

The problems resulting from the cross-temperature effects may be more pronounced as the number of bits per cell of the memory device increases. For example, data blocks in a memory system are formed from a number of memory cells. Each of the memory cells can store one or more bits of binary data corresponding to the data received from a host system. In one example, a block of the memory system can be configured as SLC memory, where each memory cell of the SLC memory can be programmed with a single bit of data. Other data blocks in the memory system can be configured as higher density memory, such as multi-level cell (MLC) memory that is programed by storing two bits per memory cell, three bits per memory cell, four bits per memory cell, or more bits per memory cell. For example, some MLC cells can store two bits of data, others referred to triple-level cell (TLC) memory can store three bits of data, while still others referred to as quad-level cell (QLC) memory can store four bits of data. The errors resulting from cross-temperature effects may be may be more prevalent for MLC memory, TLC memory, and/or QLC memory.

In some cases, mitigating cross-temperature effects may be critical in NAND-based memory devices. For example, cross-temperature effects based on a difference in temperature between a write operation and a read operation may cause data corruption during read operations associated with NAND-based memory devices. For example, read errors caused by the cross-temperature effects may result in the memory device performing error correction operations and/or re-reading data, thereby increasing latency associated with providing the data to a host device (e.g., latency may be introduced associated time spent performing error correction operations and/or re-reading data). In some cases, data stored by the memory device may be associated with high performance requirements. For example, boot data (sometimes referred to as initialization data) may include data that is used by a host device during a bootup process and may be associated with high performance requirements to enable the host device to complete the bootup process quickly. Increased latency associated with reading such data may result in the memory device failing to meet a targeted performance for reading and/or providing the data. Accordingly, failure to mitigate the cross-temperature effects may result in negative impacts to the reliability and/or the functionality of non-volatile memory devices, such as NAND device.

Some implementations described herein enable thermal duplication of data. For example, a memory device may write and/or maintain multiple copies of data that are written at different temperatures. For example, the memory device may write multiple copies of the data based on detecting that the data is to be associated with thermal duplication, as described herein. The multiple copies of the data may be associated with respective temperature profiles. A temperature profile may include a range of temperatures and/or temperatures satisfying (or not satisfying) one or more thresholds. The multiple copies of the data may be written at temperatures of the memory device that correspond to the respective temperature profiles. The memory device may receive, from a host device, a read request associated with the data. The memory device may detect a current temperature of the memory device based on receiving the read request. The memory device may read a copy, from the multiple copies, that is associated with a temperature profile that corresponds to the current temperature of the memory device. The memory device may provide, to the host device, the data base on reading the copy.

As a result, cross-temperature effects are mitigated by the memory device because a difference between a read temperature and a write temperature of the data may be decreased. For example, by maintaining multiple copies of the same data written at different temperatures, the memory device may be enabled to read a copy of the data that was written at a temperature that most closely aligns with the current temperature of the memory device. This reduces errors (e.g., read errors) associated with reading the data. By reducing the errors associated with reading the data, latency associated with providing the data to the host device is reduced.

FIG. 1 is a diagram illustrating an example system 100 capable of thermal duplication of data. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, an SSD, a flash memory device (e.g., a NAND flash memory device or a negative-or (NOR) flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to detect that data is to be associated with thermal duplication; write multiple copies of the data based on detecting that the data is to be associated with the thermal duplication, wherein the multiple copies of the data are associated with respective temperature profiles, and wherein the multiple copies are written at temperatures of the memory device that correspond to the respective temperature profiles; receive, from a host device, a read request associated with the data; detect a current temperature of the memory device based on receiving the read request; and read a copy, from the multiple copies, that is associated with a temperature profile that corresponds to the current temperature of the memory device.

In some implementations, the memory device 120 and/or the controller 130 may be configured to detect that data is to be written for a set of temperature profiles; write, at respective temperatures corresponding to the set of temperature profiles, multiple copies of the data; receive, from a host device, a read request associated with the data; detect, based on receiving the read request, a current temperature of the memory device; read a copy, from the multiple copies, that is associated with a temperature profile, from the set of temperature profiles, that corresponds to the current temperature of the memory device; and provide, to the host device, the copy of the data.

In some implementations, the memory device 120 and/or the controller 130 may be configured to detect that data is to be associated with thermal duplication; and write multiple copies of the data based on detecting that the data is to be associated with the thermal duplication, wherein the multiple copies of the data are associated with respective temperature profiles, and wherein the multiple copies are written at temperatures of the memory device that correspond to the respective temperature profiles.

As indicated above, FIG. 1 is provided as an example. Other examples may differ from what is described with regard to FIG. 1.

Figure 2:
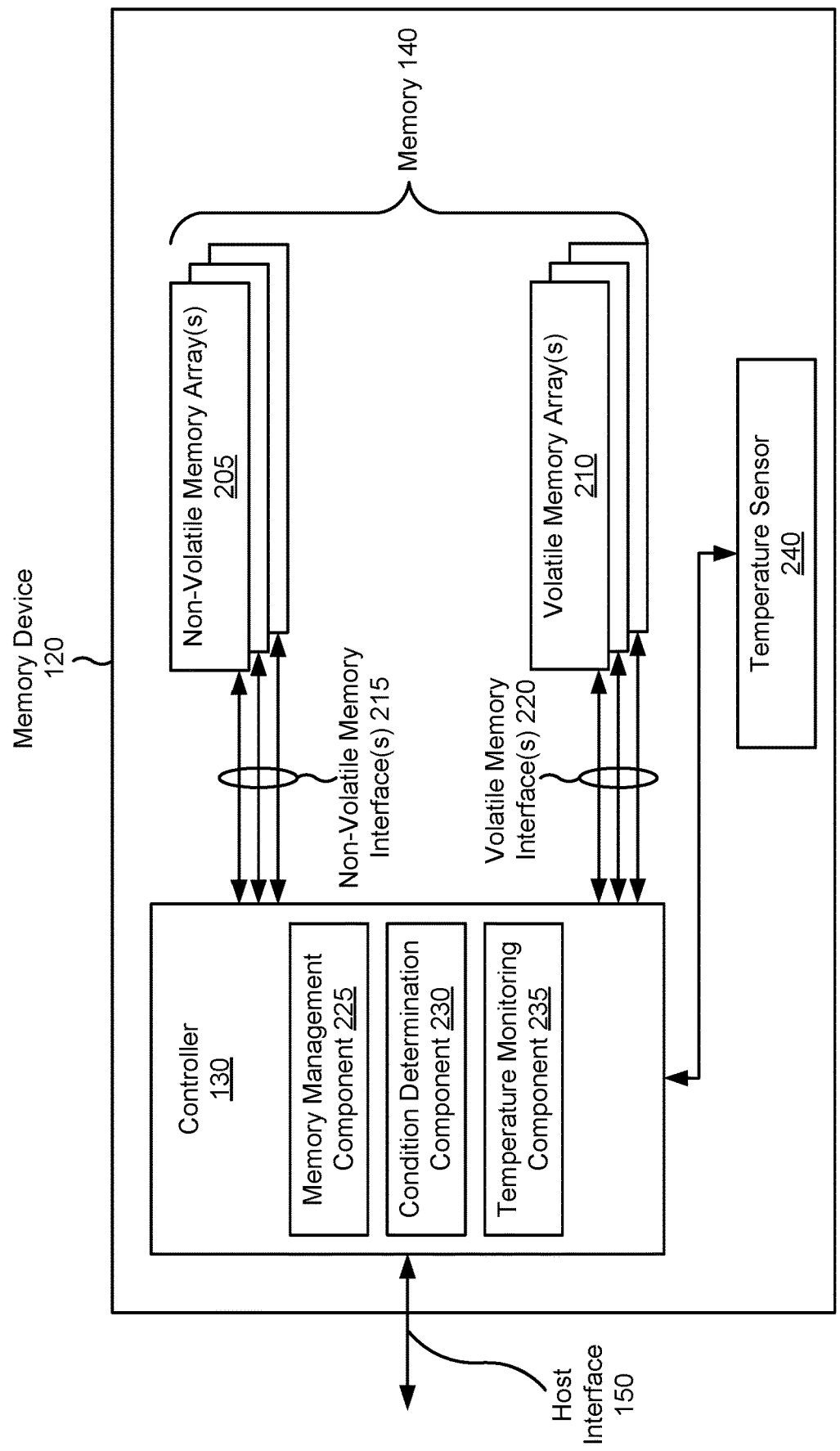
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, a condition determination component 230, a temperature monitoring component 235, and/or a temperature sensor 240. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The condition determination component 230 may be configured to determine whether one or more conditions of the memory device 120, are satisfied. For example, the condition determination component 230 may determine whether a condition associated with performing thermal duplication of data is satisfied (e.g., for a given piece of data). Additionally, or alternatively, the condition determination component 230 may determine a temperature profile that is associated with a given temperature of the memory device 120 (e.g., by determining whether the given temperature satisfies one or more temperature thresholds).

The temperature monitoring component 235 may be configured to track and/or maintain indications of a temperature of the memory device 120. In some implementations, the temperature monitoring component 235 may be configured to query and/or communicate with the temperature sensor 240 to obtain indications of a temperature that is sensed and/or detected by the temperature sensor 240. In some implementations, the temperature monitoring component 235 may be configured categorize a given temperature into a temperature profile, as described in more detail elsewhere herein.

The temperature sensor 240 may be configured to sense (e.g., detect) temperature information associated with the memory device 120. For example, temperature information may include an operating temperature of the memory device 120, a storage temperature (e.g., an on shelf or in system storage temperature) of the memory device 120, and/or a temperature of a component of the memory device 120 over a life span of the memory device 120. For example, the temperature sensor 240 may sense a temperature of the memory device 120 over a time period such that an average temperature of the memory device 120 over the time period may be tracked and/or at a time at which operations are performed on a memory block (e.g., a write operation, a read operation, an erase operation, and/or analysis operations). In some implementations, the temperature sensor 240 may store (e.g., in memory 140) the temperature information in one or more information tables, such as a lookup table. In some implementations, the temperature sensor 240 may be configured to provide (e.g., to the controller 130) a temperature at a time at which an operation (e.g., a write operation and/or a read operation) is performed by the memory device 120. In some implementations, the temperature sensor 240 may be configured to provide (e.g., to the controller 130) a temperature based on receiving a query from the controller 130.

One or more devices or components shown in FIG. 2 may be configured to perform operations described herein, such as one or more operations and/or methods described in connection with FIGS. 4-9. For example, the controller 130, the memory management component 225, the condition determination component 230, the temperature monitoring component 235, and/or the temperature sensor 240 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
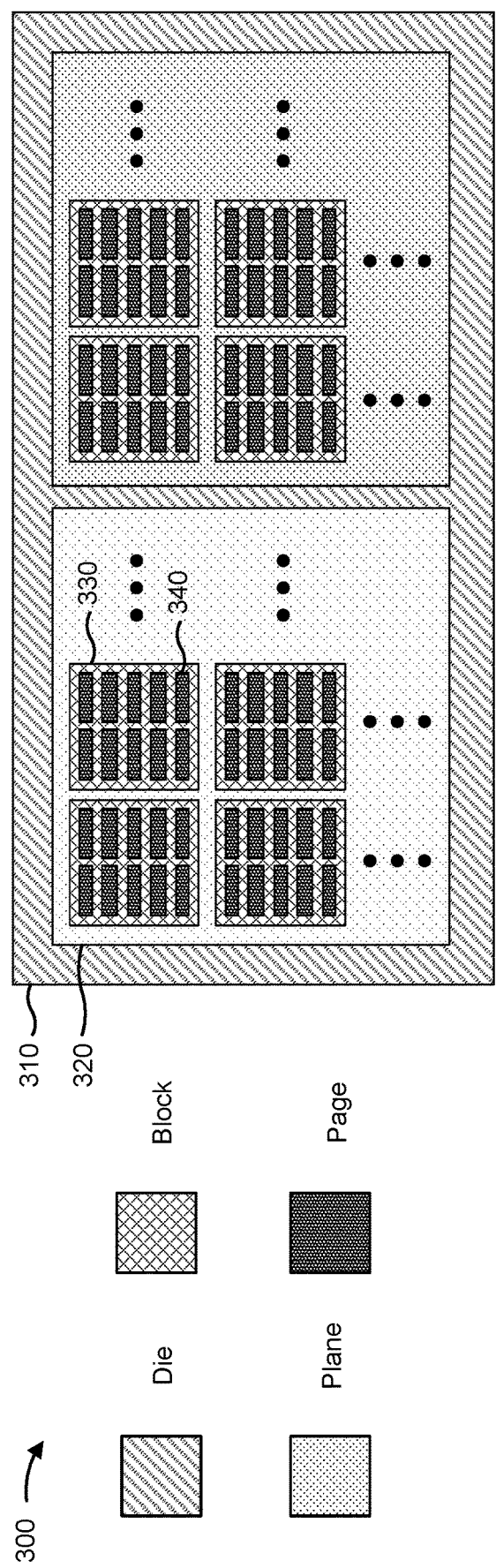
FIG. 3 is a diagram illustrating an example memory architecture that may be used by the memory device.
Figure 3:
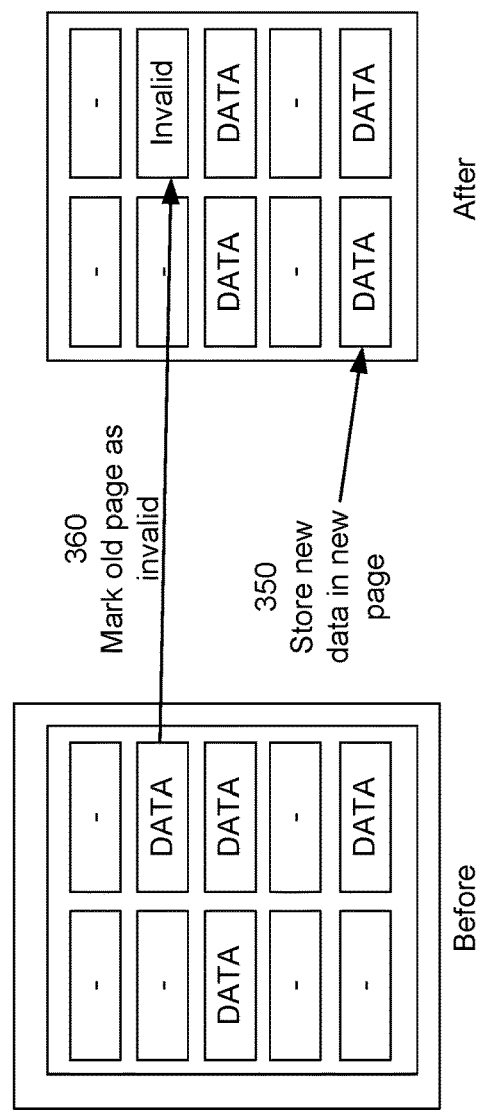

FIG. 3 is a diagram illustrating an example memory architecture 300 that may be used by the memory device 120. The memory device 120 may use the memory architecture 300 to store data. As shown, the memory architecture 300 may include a die 310, which may include multiple planes 320. A plane 320 may include multiple blocks 330. A block 330 may include multiple pages 340. Although FIG. 3 shows a particular quantity of planes 320 per die 310, a particular quantity of blocks 330 per plane 320, and a particular quantity of pages 340 per block 330, these quantities may be different than what is shown. In some implementations, the memory architecture 300 is a NAND memory architecture.

The die 310 is a structure made of semiconductor material, such as silicon. In some implementations, a die 310 is the smallest unit of memory that can independently execute commands. A memory device 120 may include one or more dies 310. In some implementations, the memory device 120 may include multiple dies 310. In this case, multiples dies 310 may each perform a respective memory operation (e.g., a read operation, a write operation, or an erase operation) in parallel. For example, a controller 130 of the memory device 120 may be configured to concurrently perform memory operations on multiple dies 310 for parallel control.

Each die 310 of a memory device 120 includes one or more planes 320. A plane 320 is sometimes called a memory plane. In some implementations, identical and concurrent operations can be performed on multiple planes 320 (sometimes with restrictions). For example, a multi-plane command (e.g., a multi-plane read command or a multi-plane write command) may be executed on multiple planes 320 concurrently, whereas a single plane command (e.g., a single plane read command or a single plane write command) may be executed on a single plane 320. A logical unit of the memory device 120 may include one or more planes 320 of a die 310. In some implementations, a logical unit may include all planes 320 of a die 310 and may be equivalent to a die 310. Alternatively, a logical unit may include fewer than all planes 320 of a die 310. A logical unit may be identified by a logical unit number (LUN). Depending on the context, the term "LUN" may refer to a logical unit or an identifier (e.g., a number) of that logical unit.

Each plane 320 includes multiple blocks 330. A block 330 is sometimes called a memory block. Each block 330 includes multiple pages 340. A page 340 is sometimes called a memory page. A block 330 is the smallest unit of memory that can be erased. In other words, an individual page 340 of a block 330 cannot be erased without erasing every other page 340 of the block 330. A page 340 is the smallest unit of memory to which data can be written (i.e., the smallest unit of memory that can be programmed with data). The terminology "programming" memory and "writing to" memory may be used interchangeably. A page 340 may include multiple memory cells that are accessible via the same access line (sometimes called a word line). In some implementations, a block 330 may be divided into multiple sub-blocks. A sub-block is a portion of a block 330 and may include a subset of pages 340 of the block and/or a subset of memory cells of the block 330.

In some implementations, read and write operations are performed for a specific page 340, while erase operations are performed for a block 330 (e.g., all pages 340 in the block 330). In some implementations, to prevent wearing out of memory, all pages 340 of a block 330 may be programmed before the block 330 is erased to enable a new program operation to be performed to a page 340 of the block 330. After a page 340 is programmed with data (called "old data" below), that data can be erased, but that data cannot be overwritten with new data prior to being erased. The erase operation would erase all pages 340 in the block 330, and erasing the entire block 330 every time that new data is to replace old data would quickly wear out the memory cells of the block 330. Thus, rather than performing an erase operation, the new data may be stored in a new page (e.g., an empty page), as shown by reference number 350, and the old page that stores the old data may be marked as invalid, as shown by reference number 360. The memory device 120 may then point operations associated with the data to the new page (e.g., in an address table) and may track invalid pages to prevent program operations from being performed on invalid pages prior to an erase operation.

When a block 330 satisfies an erasure condition, the memory device 120 may select the block 330 for erasure, copy the valid data of the block 330 (e.g., to a new block 330 or to the same block 330 after erasure), and erase the block 330. For example, the erasure condition may be that all pages 340 of the block 330 or a threshold quantity or percentage of pages 340 of the block 330 are unavailable for further programming (e.g., are either invalid or already store valid data). As another example, the erasure condition may be that a quantity or percentage of free pages 340 of the block 330 (e.g., pages 340 that are available to be written) is less than or equal to a threshold. The process of selecting a block 330 satisfying an erasure condition, copying valid pages 340 of that block 330 to a new block 330 (or the same block 330 after erasure), and erasing the block 330 is sometimes called garbage collection and is used to free up memory space of the memory device 120.

As indicated above, FIG. 3 is provided as an example. Other examples may differ from what is described with regard to FIG. 3.

Figure 4:
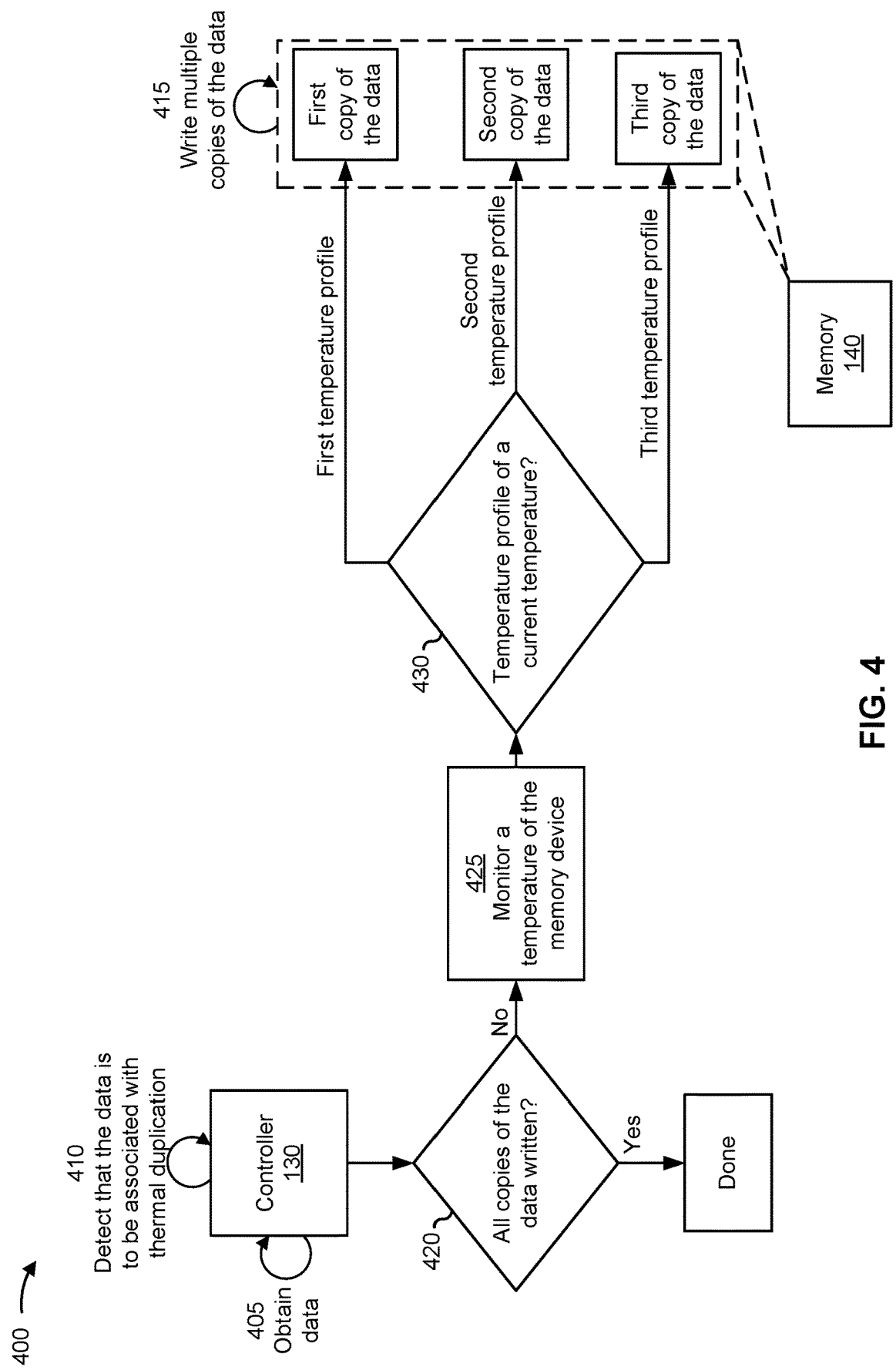
FIGS. 4-6 are diagrams of examples of thermal duplication of data.

FIG. 4 is a diagram of an example 400 of thermal duplication of data. The operations described in connection with FIG. 4 may be performed by the memory device 120 and/or one or more components of the memory device 120, such as the controller 130 and/or one or more components of the controller 130.

As shown by reference number 405, the memory device 120 and/or the controller 130 may obtain data. For example, the memory device 120 and/or the controller 130 may receive the data from a host device (e.g., the host device 110). As another example, the memory device 120 and/or the controller 130 may obtain (e.g., read) the data from the memory 140 of the memory device 120. For example, the data may be stored in the memory 140 as part of a factory configuration or an original equipment manufacturer (OEM) configuration (e.g., the data may be stored by the memory device 120 prior to a deployment of the memory device 120).

As shown by reference number 410, the memory device 120 and/or the controller 130 may detect that the data is to be associated with thermal duplication. As used herein, "thermal duplication" may refer to the memory device 120 and/or the controller 130 writing and/or maintaining multiple copies of the data that are written at respective (e.g., different) temperatures. Each copy of the data may include the same information (e.g., the multiple copies may be identical copies of the data). For example, the memory device 120 and/or the controller 130 may be configured to duplicate the data for a set of temperature profiles to perform the thermal duplication.

A temperature profile may be associated with a range or type of temperature. For example, a temperature profile may be defined by a range of temperatures and/or by one or more temperature thresholds. For example, the temperature profile may include temperatures that are included in a range of temperatures. As another example, the temperature profile may include temperatures that satisfy a temperature threshold. As another example, the temperature profile may include temperatures that do not satisfy a temperature threshold. As another example, the temperature profile may include temperatures that satisfy a first temperature threshold and that do not satisfy a second temperature threshold. As described herein (e.g., in connection with FIGS. 4-6), three temperature profiles are provided as an example (e.g., a first temperature profile, a second temperature profile, and a third temperature profile). In other examples, more or less temperature profiles may be used by the memory device 120 and/or the controller 130 in a similar manner as described herein (e.g., two temperature profiles, four temperatures profiles, six temperature profiles, or another quantity of temperature profiles).

As an example, the first temperature profile may be a cold temperature profile, the second temperature profile may be a nominal temperature profile, and the third temperature profile may be a hot temperature profile. For example, the temperature profiles may be defined using two temperature thresholds (e.g., a first temperature threshold of 0° Celsius and a second temperature threshold of 85° Celsius). The first temperature profile (e.g., the cold temperature profile) may include temperatures that are less than the first temperature threshold of 0° Celsius. The second temperature profile (e.g., the nominal temperature profile) may include temperatures that are greater than or equal to the first temperature threshold of 0° Celsius and that are less than the second temperature threshold of 85° Celsius. The third temperature profile (e.g., the hot temperature profile) may include temperatures that are greater than or equal to the second temperature threshold of 85° Celsius. In such examples, the memory device 120 and/or the controller 130 may categorize a temperature of −10° Celsius into the first temperature profile, a temperature of 22° Celsius into the second temperature profile, and a temperature of 90° Celsius into the third temperature profile.

The memory device 120 and/or the controller 130 may detect that the data is to be associated with thermal duplication based on receiving an indication from the host device 110. For example, a host interface command may be defined to indicate, to the memory device 120 and/or the controller 130, that data is to be associated with thermal duplication. For example, the memory device 120 and/or the controller 130 may receive, from the host device 110, an indication that the data is to be associated with the thermal duplication. As another example, the memory device 120 and/or the controller 130 may detect that the data is to be associated with thermal duplication based on a latency parameter associated with the data. For example, the memory device 120 and/or the controller 130 may detect that the data is associated with a latency parameter that satisfies a latency threshold (e.g., indicating that the data has a strict latency requirement that is associated with the memory device 120 providing the data with low latency). For example, the memory device 120 and/or the controller 130 may not perform thermal duplication for all data stored by the memory device 120 (e.g., to conserve memory resources that would have otherwise been used to duplicate all data). Instead, the memory device 120 and/or the controller 130 may perform thermal duplication for latency sensitive data and/or for data associated with high performance requirements, such as boot data or initialization data.

In some implementations, the memory device 120 and/or the controller 130 may detect that the data is to be associated with thermal duplication based on a logical memory partition, a logical unit, and/or an LUN associated with the data. For example, a given LUN may be used for a given type of data. For example, an LUN may be associated with boot data. Therefore, based on the LUN associated with the data, the memory device 120 and/or the controller 130 may detect that the data is to be associated with thermal duplication. In other words, the memory device 120 and/or the controller 130 may be configured to perform thermal duplication of data that is associated with one or more LUNs.

As shown by reference number 415, the memory device 120 and/or the controller 130 may write multiple copies of the data based on detecting that the data is to be associated with the thermal duplication. For example, the memory device 120 and/or the controller 130 may write, at respective temperatures corresponding to the set of temperature profiles, multiple copies of the data. For example, the multiple copies of the data may be associated with respective temperature profiles from the set of temperature profiles. The multiple copies may be written at temperatures of the memory device 120 that correspond to the respective temperature profiles. For example, as shown in FIG. 4, a first copy of the data may be written (e.g., in the memory 140) at a temperature that corresponds to (e.g., is included in temperatures associated with) the first temperature profile. A second copy of the data may be written (e.g., in the memory 140) at a temperature that corresponds to (e.g., is included in temperatures associated with) the second temperature profile. A third copy of the data may be written (e.g., in the memory 140) at a temperature that corresponds to (e.g., is included in temperatures associated with) the third temperature profile.

For example, as shown by reference number 420, the memory device 120 and/or the controller 130 may determine whether all copies of the data have been written. For example, the memory device 120 and/or the controller 130 may be configured to write a copy of the data for each temperature profile from the set of temperature profiles. For example, as shown in FIG. 4, the set of temperature profiles may include three temperature profiles. Therefore, in such examples, the memory device 120 and/or the controller 130 may determine whether three copies of the data (e.g., written at respective temperatures for the set of temperature profiles) have been written. If the memory device 120 and/or the controller 130 determines that all copies of the data have been written (e.g., Yes, as shown in FIG. 4), then a write operation associated with the thermal duplication may be completed (e.g., Done, as shown in FIG. 4). If the memory device 120 and/or the controller 130 determines that fewer than all of the copies of the data have been written (e.g., No, as shown in FIG. 4), then the memory device 120 and/or the controller 130 may continue to monitor a temperature of the memory device 120 and write the copies of the data, as described in more detail elsewhere herein.

For example, as shown by reference number 425, the memory device 120 and/or the controller 130 may monitor a temperature of the memory device 120. For example, the memory device 120 and/or the controller 130 may obtain one or more indications of the temperature from the temperature sensor 240. In some implementations, the memory device 120 and/or the controller 130 may periodically (e.g., according to an interval of time, such as every X seconds) query the temperature sensor 240 to obtain a current temperature of the memory device 120. Additionally, or alternatively, the temperature sensor 240 may be configured to provide an indication of a temperature of the memory device 120 based on the temperature changing by a threshold amount and/or based on the temperature satisfying (or not satisfying) one or more temperature thresholds. For example, the temperature sensor 240 may be configured to provide (e.g., to the controller 130) an indication of a temperature of the memory device 120 when a temperature of the memory device changes from one temperature profile to another temperature profile (e.g., when the temperature crosses a temperature threshold associated with the set of temperature profiles).

As shown by reference number 430, the memory device 120 and/or the controller 130 may determine a temperature profile that corresponds to a current temperature of the memory device 120. For example, the memory device 120 and/or the controller 130 may determine that the current temperature corresponds to a temperature profile based on the current temperature being included in a range of temperatures associated with the temperature profile. As another example, the memory device 120 and/or the controller 130 may determine that the current temperature corresponds to a temperature profile based on the current temperature satisfying a temperature threshold associated with the temperature profile. As another example, the memory device 120 and/or the controller 130 may determine that the current temperature corresponds to a temperature profile based on the current temperature satisfying a first temperature threshold and not satisfying a second temperature threshold.

For example, the memory device 120 and/or the controller 130 may determine that a current temperature of the memory device 120 corresponds to the first temperature profile. The memory device 120 and/or the controller 130 may determine whether a copy of the data has been written for the first temperature profile. If the memory device 120 and/or the controller 130 determines that a copy of the data has not been written for the first temperature profile, then the memory device 120 and/or the controller 130 may write the copy (e.g., the first copy of the data as shown in FIG. 4). If the memory device 120 and/or the controller 130 determines that a copy of the data has already been written for the first temperature profile, then the memory device 120 and/or the controller 130 may continue to monitor the temperature of the memory device 120 until all copies of the data are written (e.g., the process may return to the block shown by reference number 420).

For example, the memory device 120 and/or the controller 130 may determine that a current temperature of the memory device 120 corresponds to the second temperature profile. The memory device 120 and/or the controller 130 may determine whether a copy of the data has been written for the second temperature profile. If the memory device 120 and/or the controller 130 determines that a copy of the data has not been written for the second temperature profile, then the memory device 120 and/or the controller 130 may write the copy (e.g., the second copy of the data as shown in FIG. 4). If the memory device 120 and/or the controller 130 determines that a copy of the data has already been written for the second temperature profile, then the memory device 120 and/or the controller 130 may continue to monitor the temperature of the memory device 120 until all copies of the data are written (e.g., the process may return to the block shown by reference number 420).

For example, if the memory device 120 and/or the controller 130 determines that a copy of the data has not been written for the second temperature profile, then the memory device 120 and/or the controller 130 may read the data (e.g., from the first copy of the data or from another copy of the data). The memory device 120 and/or the controller 130 may perform one or more error correction operations to correct any errors (e.g., bit errors) associated with the read data. For example, as described elsewhere herein, cross-temperature effects may introduce errors into reading the data at a temperature that corresponds to the second temperature profile (e.g., when reading data that was written at another temperature profile). Therefore, before writing the a copy of the data for the second temperature profile, the memory device 120 and/or the controller 130 may correct any errors and/or may re-read the data (e.g., if there are uncorrectable errors). After correcting the errors and/or re-reading the data, the memory device 120 and/or the controller 130 may write the copy (e.g., the second copy of the data as shown in FIG. 4) at a temperature that corresponds to the second temperature profile. In other words, errors or latency may still exist in the process of writing the multiple copies (e.g., with any errors being corrected when writing each copy), but for latency sensitive or latency critical operations that occur after the multiple copies are written, the subsequent read operations of the multiple copies will be associated with lower latency (e.g., because less errors will need to be corrected), as described in more detail elsewhere herein.

As another example, the memory device 120 and/or the controller 130 may determine that a current temperature of the memory device 120 corresponds to the third temperature profile. The memory device 120 and/or the controller 130 may determine whether a copy of the data has been written for the third temperature profile. If the memory device 120 and/or the controller 130 determines that a copy of the data has not been written for the third temperature profile, then the memory device 120 and/or the controller 130 may write the copy (e.g., the third copy of the data as shown in FIG. 4). If the memory device 120 and/or the controller 130 determines that a copy of the data has already been written for the third temperature profile, then the memory device 120 and/or the controller 130 may continue to monitor the temperature of the memory device 120 until all copies of the data are written (e.g., the process may return to the block shown by reference number 420).

The memory device 120 and/or the controller 130 may continue to monitor the temperature of the memory device 120 and write multiple copies of the data for respective temperature profiles from the set of temperature profiles. For example, the memory device 120 and/or the controller 130 may continue to monitor the temperature of the memory device 120 and write copies of the data until a copy of the data has been written for each temperature profile from the set of temperature profiles.

As indicated above, FIG. 4 is provided as an example. Other examples may differ from what is described with regard to FIG. 4.

Figure 5:
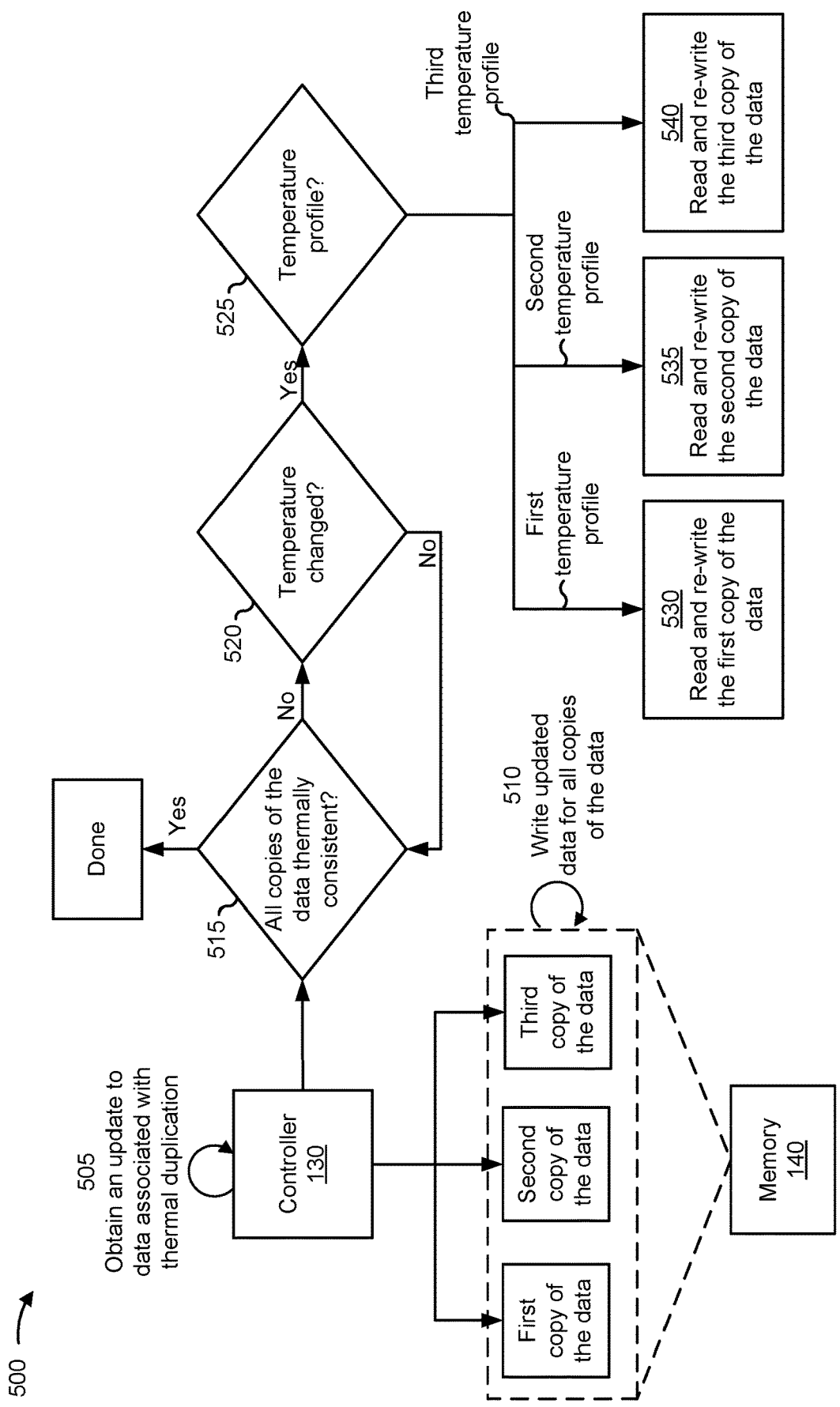

FIG. 5 is a diagram of an example 500 of thermal duplication of data. The operations described in connection with FIG. 5 may be performed by the memory device 120 and/or one or more components of the memory device 120, such as the controller 130 and/or one or more components of the controller 130. The example 500 may be associated with updating data that is associated with thermal duplication. For example, the example 500 may be associated with updating data written in a similar manner as described in connection with FIG. 4.

As shown by reference number 505, the memory device 120 and/or the controller 130 may obtain an update to data that is associated with thermal duplication. For example, the memory device 120 and/or the controller 130 may receive (e.g., from the host device 110) an indication of an update indicating updated data associated with the data.

As shown by reference number 510, the memory device 120 and/or the controller 130 may write the updated data for all copies of the data. For example, the memory device 120 may be associated with a first temperature (e.g., a first operating temperature) at the time at which the updated data is received. The memory device 120 and/or the controller 130 may write, based on receiving the updated data, the updated data for the multiple copies of the data at the first temperature. In other words, the memory device 120 and/or the controller 130 may write the updated data for all copies of the data after receiving the updated data (e.g., without waiting for the temperature of the memory device 120 to change to different temperature profiles). For example, the memory device 120 and/or the controller 130 may write, based on receiving the indication of the update, the updated data for the multiple copies of the data in respective storage locations. The updated data may be written for the multiple copies regardless of a temperature of the memory device 120 when the indication of the update is received.

This may ensure a coherency of the data across the multiple copies of the data. For example, this may ensure that the multiple copies of the data all store the same information (e.g., the updated data). For example, because the temperature of the memory device 120 may be influenced by external factors outside of the control of the memory device 120, waiting to update the different copies of the data until the temperature of the memory device 120 corresponds to a temperature profile of the respective copies may result in different copies storing different data at a given time. Therefore, to ensure coherency of the data across the multiple copies of the data, the memory device 120 and/or the controller 130 may write the updated data for all copies of the data regardless of the temperature of the memory device 120.

To mitigate the cross-temperature effects, the memory device 120 and/or the controller 130 may be configured to monitor and re-write the updated data at respective temperatures (for respective temperature profiles) after initially writing the updated data. In other words, the memory device 120 and/or the controller 130 may perform an internal read and re-write operation for the updated data at respective temperatures corresponding to the set of temperature profiles. For example, as shown by reference number 515, the memory device 120 and/or the controller 130 may determine whether all copies of the data are thermally consistent. As used herein, "thermally consistent" may refer to the copy of the data being written at a temperature that corresponds to a temperature profile associated with the copy of the data. If the memory device 120 and/or the controller 130 determines that all copies of the data are thermally consistent (e.g., Yes, as shown in FIG. 5), then the update procedure for the data associated with thermal duplication may be completed (e.g., Done, as shown in FIG. 5).

If the memory device 120 and/or the controller 130 determines that at least one of the copies of the data is not thermally consistent (e.g., No, as shown in FIG. 5), then the memory device 120 and/or the controller 130 may determine whether a temperature of the memory device 120 has changed (e.g., as shown by reference number 520). For example, the memory device 120 and/or the controller 130 may determine whether a temperature profile has changed based on a temperature change of the memory device 120. For example, if the memory device 120 and/or the controller 130 determines that the temperature and/or temperature profile of the memory device 120 has not changed (e.g., No, as shown in FIG. 5), then the memory device 120 and/or the controller 130 continue to monitor the temperature of the memory device 120 until all copies of the data are thermally consistent.

For example, the memory device 120 and/or the controller 130 may monitor an operating temperature of the memory device 120. For example, the memory device 120 and/or the controller 130 may periodically (e.g., according to an interval of time, such as every X seconds) query the temperature sensor 240 to obtain a current temperature of the memory device 120. Additionally, or alternatively, the temperature sensor 240 may be configured to provide an indication of a temperature of the memory device 120 based on the temperature changing by a threshold amount and/or based on the temperature satisfying (or not satisfying) one or more temperature thresholds. For example, the temperature sensor 240 may be configured to provide (e.g., to the controller 130) an indication of a temperature of the memory device 120 when a temperature of the memory device changes from one temperature profile to another temperature profile (e.g., when the temperature crosses a temperature threshold associated with the set of temperature profiles). The memory device 120 and/or the controller 130 may detect that an operating temperature of the memory device 120 has changed from the first operating temperature to a second operating temperature (e.g., Yes, as shown in FIG. 5).

As shown by reference number 525, the memory device 120 and/or the controller 130 may determine a temperature profile associated with the new operating temperature. For example, the updated data may be initially written at a temperature that corresponds to a temperature profile from the set of temperature profiles. The memory device 120 and/or the controller 130 may refrain from performing the internal read and re-write operation for the copy of the data associated with that temperature profile (e.g., because that copy is already thermally consistent). For example, the temperature profile of the memory device 120 at a time at which the updated data is written for the multiple copies (e.g., as shown by reference number 510) may be the second temperature profile. The second operating temperature (e.g., the new operating temperature) may be associated with the first temperature profile. Therefore, as shown by reference number 530, the memory device 120 and/or the controller 130 may read the updated data (e.g., from a storage location associated with the first copy of the data that is associated with the first temperature profile). The memory device 120 and/or the controller 130 may re-write the updated data at the operating temperature that is associated with the first temperature profile (e.g., the second operating temperature).

Similarly, if the memory device 120 and/or the controller 130 detects that the second operating temperature corresponds to the second temperature profile (e.g., and the temperature profile of the memory device 120 at a time at which the updated data is written for the multiple copies (e.g., as shown by reference number 510) is the first temperature profile or the third temperature profile), then the memory device 120 and/or the controller 130 may read and re-write the updated data for the second copy of the data (e.g., that is associated with the second temperature profile), as shown by reference number 535. For example, the memory device 120 and/or the controller 130 may read the updated data associated with the second copy that is associated with the second temperature profile. The memory device 120 and/or the controller 130 may write, at the second operating temperature, the updated data for the second copy.

As another example, if the memory device 120 and/or the controller 130 detects that the second operating temperature corresponds to the third temperature profile (e.g., and the temperature profile of the memory device 120 at a time at which the updated data is written for the multiple copies (e.g., as shown by reference number 510) is the first temperature profile or the second temperature profile), then the memory device 120 and/or the controller 130 may read and re-write the updated data for the third copy of the data (e.g., that is associated with the second temperature profile), as shown by reference number 540. For example, the memory device 120 and/or the controller 130 may read the updated data associated with the third copy that is associated with the third temperature profile. The memory device 120 and/or the controller 130 may write, at the second operating temperature, the updated data for the third copy.

Returning to reference number 515, the memory device 120 and/or the controller 130 may continue to monitor the temperature of the memory device and read and re-write copies of the updated data until all copies of the updated data are thermally consistent. For example, if a write-at-hot version of the data has not yet been written at a hot temperature and the temperature becomes hot, then the memory device 120 and/or the controller 130 may internally read and re-write the data so that the updated data has been written at a hot temperature. As another example, if a write-at-cold version of the data has not yet been written at a cold temperature and the temperature becomes cold, then the memory device 120 and/or the controller 130 may internally read and re-write the data so that the updated data has been written at a cold temperature. As another example, if a write-at-nominal version of the data has not yet been written at a nominal temperature and the temperature becomes nominal, then the memory device 120 and/or the controller 130 may internally read and re-write the data so that the updated data has been written at a nominal temperature.

As a result, the memory device 120 and/or the controller 130 may be enabled to maintain a coherency of the multiple copies of the data while also maintaining copies of the updated data written at respective temperatures and/or temperature profiles. This reduces errors (e.g., read errors) associated with reading the updated data. By reducing the errors associated with reading the data, latency associated with providing the updated data to the host device 110 is reduced, as described in more detail elsewhere herein.

As indicated above, FIG. 5 is provided as an example. Other examples may differ from what is described with regard to FIG. 5.

Figure 6:
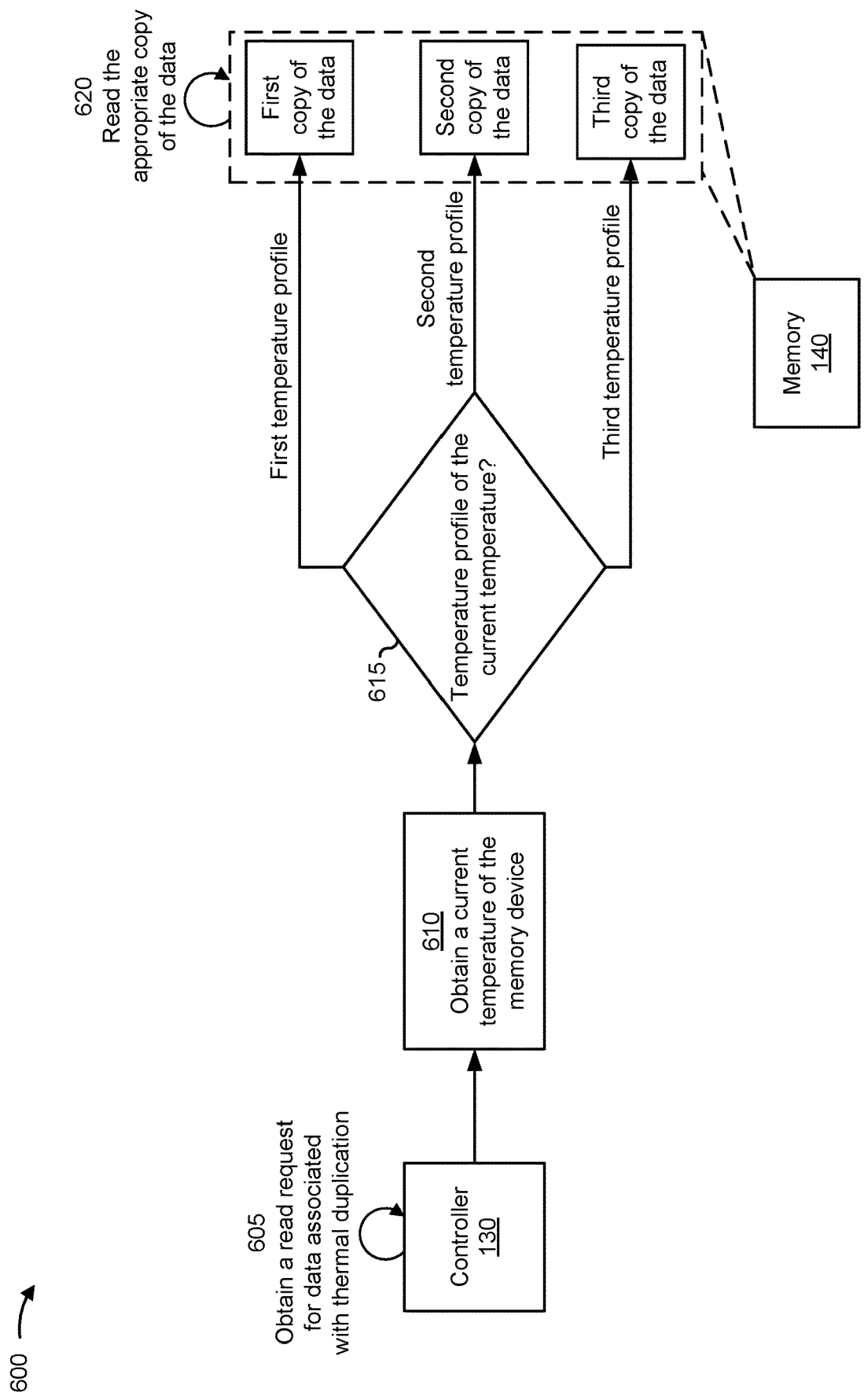

FIG. 6 is a diagram of an example 600 of thermal duplication of data. The operations described in connection with FIG. 6 may be performed by the memory device 120 and/or one or more components of the memory device 120, such as the controller 130 and/or one or more components of the controller 130. The example 600 may be associated with reading data that is associated with thermal duplication. For example, the example 600 may be associated with reading data that is written in a similar manner as described in connection with FIG. 4 and/or that is updated in a similar manner as described in connection with FIG. 5.

As shown by reference number 605, the memory device 120 and/or the controller 130 may obtain a read request for data that is associated with thermal duplication. For example, the memory device 120 and/or the controller 130 may receive, from the host device 110, a read request associated with the data.

As shown by reference number 610, the memory device 120 and/or the controller 130 may obtain and/or detect, based on receiving the read request, a current temperature of the memory device 120. For example, the memory device 120 and/or the controller 130 may provide, to the temperature sensor 240, a request (e.g., a query) for the current temperature of the memory device 120. The memory device 120 and/or the controller 130 may obtain, from the temperature sensor 240, an indication of the current temperature. In other words, receiving the read request for data (e.g., that is associated with thermal duplication) may trigger the memory device 120 and/or the controller 130 to detect the current temperature of the memory device 120.

As shown by reference number 615, the memory device 120 and/or the controller 130 may determine a temperature profile of the current temperature. For example, the memory device 120 and/or the controller 130 may determine a temperature profile that corresponds to a current temperature of the memory device 120. For example, the memory device 120 and/or the controller 130 may determine that the current temperature corresponds to a temperature profile based on the current temperature being included in a range of temperatures associated with the temperature profile. As another example, the memory device 120 and/or the controller 130 may determine that the current temperature corresponds to a temperature profile based on the current temperature satisfying a temperature threshold associated with the temperature profile. As another example, the memory device 120 and/or the controller 130 may determine that the current temperature corresponds to a temperature profile based on the current temperature satisfying a first temperature threshold and not satisfying a second temperature threshold.

As shown by reference number 620, the memory device 120 and/or the controller 130 may read a copy, from the multiple copies, that is associated with the temperature profile that corresponds to the current temperature of the memory device 120. For example, the memory device 120 and/or the controller 130 may store (e.g., for each copy of the data) an indication of a temperature and/or a temperature profile associated with the copy of the data. After determining the temperature profile that corresponds to the current temperature of the memory device 120, the memory device 120 and/or the controller 130 may search for a copy of the data that is associated with the temperature profile.

For example, if the memory device 120 and/or the controller 130 determines that the current temperature corresponds to (e.g., is included in) the first temperature profile, then the memory device 120 and/or the controller 130 may read the first copy of the data (e.g., that was written at a temperature that corresponds to the first temperature profile, as described in more detail in connection with FIGS. 4 and 5). If the memory device 120 and/or the controller 130 determines that the current temperature corresponds to (e.g., is included in) the second temperature profile, then the memory device 120 and/or the controller 130 may read the second copy of the data (e.g., that was written at a temperature that corresponds to the second temperature profile, as described in more detail in connection with FIGS. 4 and 5). Similarly, if the memory device 120 and/or the controller 130 determines that the current temperature corresponds to (e.g., is included in) the third temperature profile, then the memory device 120 and/or the controller 130 may read the third copy of the data (e.g., that was written at a temperature that corresponds to the third temperature profile, as described in more detail in connection with FIGS. 4 and 5).

The memory device and/or the controller 130 may process the copy of the data based on reading the appropriate copy of the data. This may reduce read errors and/or a bit error rate associated with reading the data because the copy of the data was written at the same temperature profile as a current temperature of the memory device. In other words, a difference between a write temperature of the data and a read temperature of the data may be reduced (e.g., as compared to a scenario in which only a single copy of the data is written or programmed). The memory device and/or the controller 130 may providing, to the host device 110, the data based on reading the appropriate copy of the data. By reducing the errors associated with reading the data, latency associated with providing the data to the host device 110 is reduced.

As indicated above, FIG. 6 is provided as an example. Other examples may differ from what is described with regard to FIG. 6.

Figure 7:
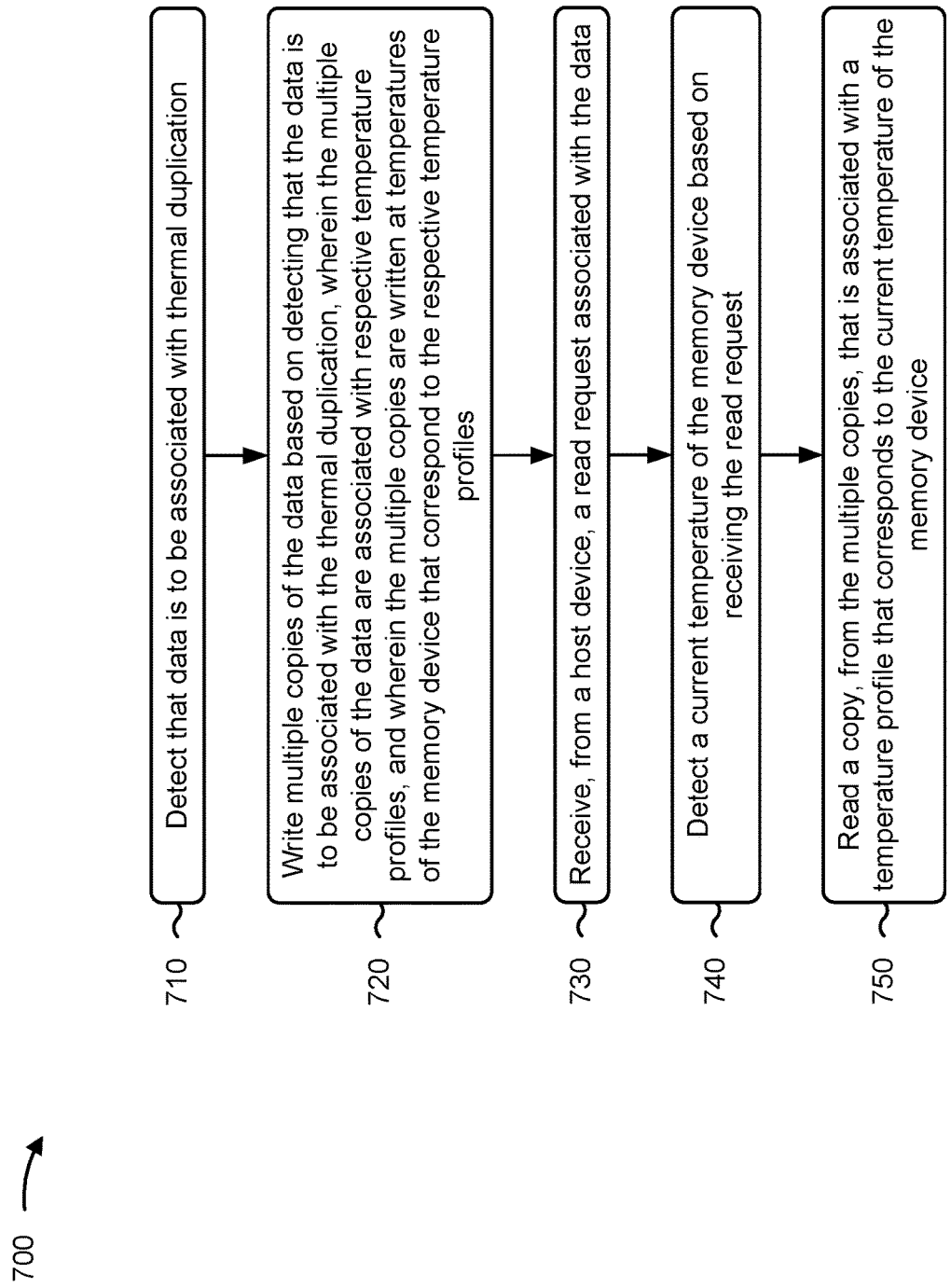
FIGS. 7-9 are flowcharts of example methods associated with thermal duplication of data.

FIG. 7 is a flowchart of an example method 700 associated with thermal duplication of data. In some implementations, a memory device (e.g., the memory device 120) may perform or may be configured to perform the method 700. In some implementations, another device or a group of devices separate from or including the memory device (e.g., the system 100) may perform or may be configured to perform the method 700. Additionally, or alternatively, one or more components of the memory device (e.g., the controller 130, the memory management component 225, the condition determination component 230, the temperature monitoring component 235, and/or the temperature sensor 240) may perform or may be configured to perform the method 700. Thus, means for performing the method 700 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 700.

As shown in FIG. 7, the method 700 may include detecting that data is to be associated with thermal duplication (block 710). As further shown in FIG. 7, the method 700 may include writing multiple copies of the data based on detecting that the data is to be associated with the thermal duplication, wherein the multiple copies of the data are associated with respective temperature profiles, and wherein the multiple copies are written at temperatures of the memory device that correspond to the respective temperature profiles (block 720). As further shown in FIG. 7, the method 700 may include receiving, from a host device, a read request associated with the data (block 730). As further shown in FIG. 7, the method 700 may include detecting a current temperature of the memory device based on receiving the read request (block 740). As further shown in FIG. 7, the method 700 may include reading a copy, from the multiple copies, that is associated with a temperature profile that corresponds to the current temperature of the memory device (block 750).

The method 700 may include additional aspects, such as any single aspect or any combination of aspects described below and/or described in connection with one or more other methods or operations described elsewhere herein.

In a first aspect, the method 700 includes receiving an indication of an update indicating updated data associated with the data, and writing, based on receiving the indication of the update, the updated data for the multiple copies of the data in respective storage locations, wherein the updated data is written for the multiple copies regardless of a temperature of the memory device when the indication of the update is received.

In a second aspect, alone or in combination with the first aspect, the method 700 includes monitoring an operating temperature of the memory device, detecting that the operating temperature corresponds to a second temperature profile, reading the updated data associated with a first copy, from the multiple copies, that is associated with the second temperature profile, and writing, at the operating temperature, the updated data for the first copy.

In a third aspect, alone or in combination with one or more of the first and second aspects, the method 700 includes detecting that the data is associated with a latency parameter that satisfies a latency threshold.

In a fourth aspect, alone or in combination with one or more of the first through third aspects, the method 700 includes receiving, from the host device, an indication that the data is to be associated with the thermal duplication.

In a fifth aspect, alone or in combination with one or more of the first through fourth aspects, the method 700 includes detecting that the data is to be associated with the thermal duplication based on a logical memory partition associated with the data.

In a sixth aspect, alone or in combination with one or more of the first through fifth aspects, the temperature profile includes at least one of: a range of temperatures, one or more temperatures that satisfy a first threshold, temperatures that satisfy a second threshold and do not satisfy the first threshold, or temperatures that do not satisfy the second threshold.

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein.

Figure 8:
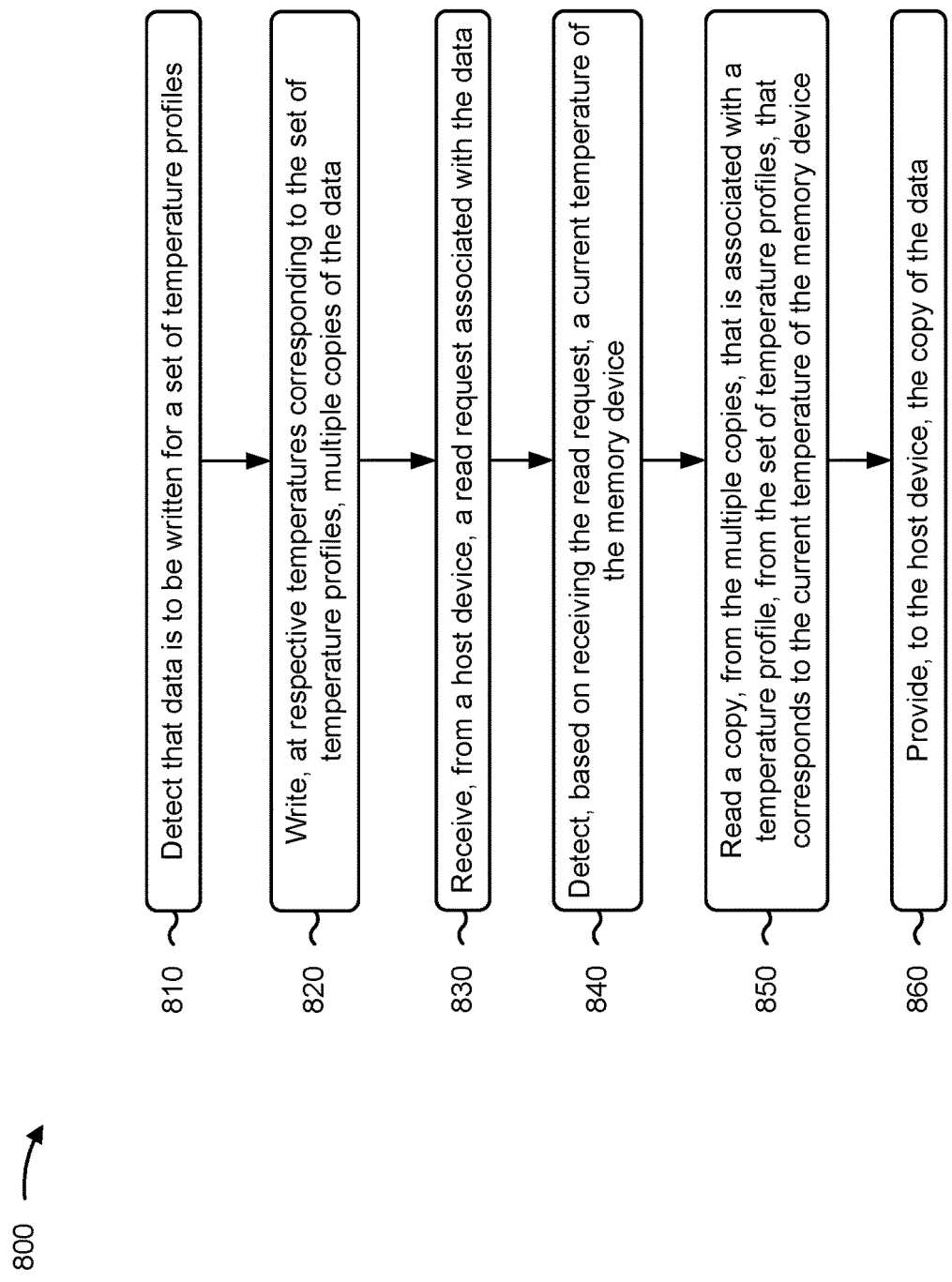

FIG. 8 is a flowchart of an example method 800 associated with thermal duplication of data. In some implementations, a memory device (e.g., the memory device 120) may perform or may be configured to perform the method 800. In some implementations, another device or a group of devices separate from or including the memory device (e.g., the system 100) may perform or may be configured to perform the method 800. Additionally, or alternatively, one or more components of the memory device (e.g., the controller 130, the memory management component 225, the condition determination component 230, the temperature monitoring component 235, and/or the temperature sensor 240) may perform or may be configured to perform the method 800. Thus, means for performing the method 800 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 800.

As shown in FIG. 8, the method 800 may include detecting that data is to be written for a set of temperature profiles (block 810). As further shown in FIG. 8, the method 800 may include writing, at respective temperatures corresponding to the set of temperature profiles, multiple copies of the data (block 820). As further shown in FIG. 8, the method 800 may include receiving, from a host device, a read request associated with the data (block 830). As further shown in FIG. 8, the method 800 may include detecting, based on receiving the read request, a current temperature of the memory device (block 840). As further shown in FIG. 8, the method 800 may include reading a copy, from the multiple copies, that is associated with a temperature profile, from the set of temperature profiles, that corresponds to the current temperature of the memory device (block 850). As further shown in FIG. 8, the method 800 may include providing, to the host device, the copy of the data (block 860).

The method 800 may include additional aspects, such as any single aspect or any combination of aspects described below and/or described in connection with one or more other methods or operations described elsewhere herein.

In a first aspect, the method 800 includes determining that the current temperature corresponds to the temperature profile based on the current temperature being included in a range of temperatures associated with the temperature profile, satisfying a temperature threshold associated with the temperature profile, or satisfying a first temperature threshold and not satisfying a second temperature threshold.

In a second aspect, alone or in combination with the first aspect, the method 800 includes receiving updated data associated with the data, wherein the memory device is associated with a first operating temperature at a time at which the updated data is received, and writing, based on receiving the updated data, the updated data for the multiple copies of the data at the first operating temperature.

In a third aspect, alone or in combination with one or more of the first and second aspects, the first operating temperature is associated with a first temperature profile from the set of temperature profiles, and the method 800 includes detecting that an operating temperature of the memory device has changed from the first operating temperature to a second operating temperature, wherein the second operating temperature is associated with a second temperature profile, reading the updated data, from a storage location corresponding to a first copy, from the multiple copies, that is associated with the second temperature profile, and writing, at the second operating temperature, the updated data for the first copy.

In a fourth aspect, alone or in combination with one or more of the first through third aspects, detecting that the data is to be written for the set of temperature profiles is based on at least one of a latency requirement associated with the data, a command from the host device, or a logical memory partition associated with the data.

In a fifth aspect, alone or in combination with one or more of the first through fourth aspects, the set of temperature profiles are defined based on one or more temperature thresholds.

In a sixth aspect, alone or in combination with one or more of the first through fifth aspects, the data is initialization data or boot data.

In a seventh aspect, alone or in combination with one or more of the first through sixth aspects, the set of temperature profiles includes a nominal temperature profile, a hot temperature profile, and a cold temperature profile.

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein.

Figure 9:
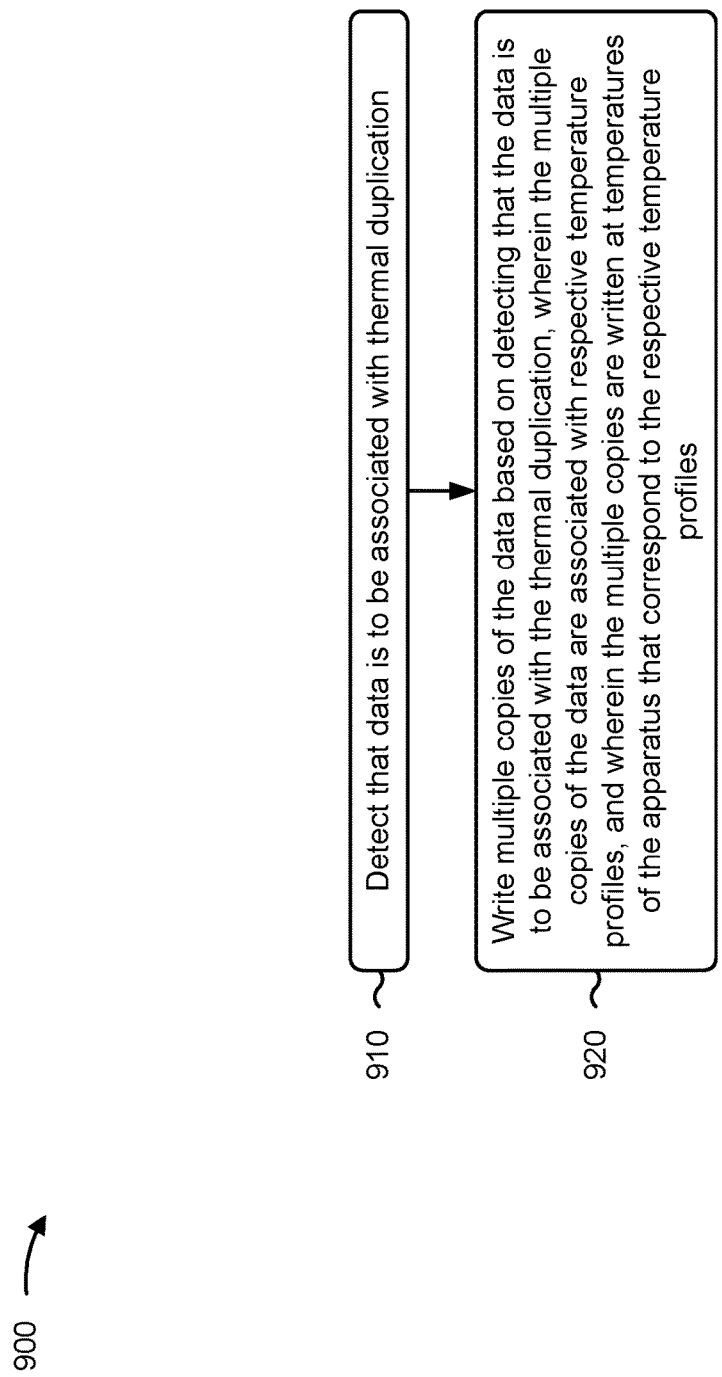

FIG. 9 is a flowchart of an example method 900 associated with thermal duplication of data. In some implementations, a memory device (e.g., the memory device 120) may perform or may be configured to perform the method 900. In some implementations, another device or a group of devices separate from or including the memory device (e.g., the system 100) may perform or may be configured to perform the method 900. Additionally, or alternatively, one or more components of the memory device (e.g., the controller 130, the memory management component 225, the condition determination component 230, the temperature monitoring component 235, and/or the temperature sensor 240) may perform or may be configured to perform the method 900. Thus, means for performing the method 900 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 900.

As shown in FIG. 9, the method 900 may include detecting that data is to be associated with thermal duplication (block 910). As further shown in FIG. 9, the method 900 may include writing multiple copies of the data based on detecting that the data is to be associated with the thermal duplication, wherein the multiple copies of the data are associated with respective temperature profiles, and wherein the multiple copies are written at temperatures of the apparatus that correspond to the respective temperature profiles (block 920).

The method 900 may include additional aspects, such as any single aspect or any combination of aspects described below and/or described in connection with one or more other methods or operations described elsewhere herein.

In a first aspect, the method 900 includes receiving, from a host device, a read request associated with the data, detecting a current temperature of the apparatus based on receiving the read request, and reading a copy, from the multiple copies, that is associated with a temperature profile that corresponds to the current temperature of the apparatus.

In a second aspect, alone or in combination with the first aspect, the method 900 includes receiving an indication of an update indicating updated data associated with the data, and writing, based on receiving the indication of the update, the updated data for the multiple copies of the data in respective storage locations, wherein the updated data is written for the multiple copies regardless of a temperature of the apparatus when the indication of the update is received.

In a third aspect, alone or in combination with one or more of the first and second aspects, the updated data is written for the multiple copies at a first temperature profile, and the method 900 includes monitoring an operating temperature of the apparatus, detecting that the operating temperature corresponds to a second temperature profile, reading the updated data from a storage location corresponding to a first copy, from the multiple copies, that is associated with the second temperature profile, and writing, at the operating temperature, the updated data for the first copy.

In a fourth aspect, alone or in combination with one or more of the first through third aspects, the means for detecting that data is to be associated with the thermal duplication comprises receiving, from a host device, an indication that the data is to be associated with the thermal duplication.

Although FIG. 9 shows example blocks of a method 900, in some implementations, the method 900 may include additional blocks, fewer blocks, different blocks, or differently arranged blocks than those depicted in FIG. 9. Additionally, or alternatively, two or more of the blocks of the method 900 may be performed in parallel. The method 900 is an example of one method that may be performed by one or more devices described herein. These one or more devices may perform or may be configured to perform one or more other methods based on operations described herein.

In some implementations, a memory device includes one or more components configured to: detect that data is to be associated with thermal duplication; write multiple copies of the data based on detecting that the data is to be associated with the thermal duplication, wherein the multiple copies of the data are associated with respective temperature profiles, and wherein the multiple copies are written at temperatures of the memory device that correspond to the respective temperature profiles; receive, from a host device, a read request associated with the data; detect a current temperature of the memory device based on receiving the read request; and read a copy, from the multiple copies, that is associated with a temperature profile that corresponds to the current temperature of the memory device.

In some implementations, a method includes detecting, by a memory device, that data is to be written for a set of temperature profiles; writing, by the memory device and at respective temperatures corresponding to the set of temperature profiles, multiple copies of the data; receiving, by the memory device and from a host device, a read request associated with the data; detecting, by the memory device and based on receiving the read request, a current temperature of the memory device; reading, by the memory device, a copy, from the multiple copies, that is associated with a temperature profile, from the set of temperature profiles, that corresponds to the current temperature of the memory device; and providing, by the memory device and to the host device, the copy of the data.

In some implementations, an apparatus includes non-volatile memory, and a controller configured to execute instructions that cause the apparatus to detect that data is to be associated with thermal duplication; and write multiple copies of the data based on detecting that the data is to be associated with the thermal duplication, wherein the multiple copies of the data are associated with respective temperature profiles, and wherein the multiple copies are written at temperatures of the apparatus that correspond to the respective temperature profiles.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
   one or more components configured to:
   detect that data is to be associated with thermal duplication;
   write multiple copies of the data based on detecting that the data is to be associated with the thermal duplication,
   wherein the multiple copies of the data are associated with respective temperature profiles, and
   wherein the multiple copies are written at temperatures of the memory device that correspond to the respective temperature profiles;
   receive, from a host device, a read request associated with the data;
   detect a current temperature of the memory device based on receiving the read request; and
   read a copy, from the multiple copies, that is associated with a temperature profile that corresponds to the current temperature of the memory device.

2. The memory device of claim 1, wherein the one or more components are further configured to:
   receive an indication of an update indicating updated data associated with the data; and
   write, based on receiving the indication of the update, the updated data for the multiple copies of the data in respective storage locations,
   wherein the updated data is written for the multiple copies regardless of a temperature of the memory device when the indication of the update is received.

3. The memory device of claim 2, wherein the updated data is written for the multiple copies at a first temperature profile, and wherein the one or more components are further configured to:
   monitor an operating temperature of the memory device;
   detect that the operating temperature corresponds to a second temperature profile;
   read the updated data associated with a first copy, from the multiple copies, that is associated with the second temperature profile; and
   write, at the operating temperature, the updated data for the first copy.

4. The memory device of claim 1, wherein the one or more components, to detect that the data is to be associated with the thermal duplication, are configured to:
   detect that the data is associated with a latency parameter that satisfies a latency threshold.

5. The memory device of claim 1, wherein the one or more components, to detect that the data is to be associated with the thermal duplication, are configured to:
   receive, from the host device, an indication that the data is to be associated with the thermal duplication.

6. The memory device of claim 1, wherein the one or more components, to detect that the data is to be associated with the thermal duplication, are configured to:
   detect that the data is to be associated with the thermal duplication based on a logical memory partition associated with the data.

7. The memory device of claim 1, wherein the temperature profile includes at least one of:
   a range of temperatures,
   one or more temperatures that satisfy a first threshold,
   temperatures that satisfy a second threshold and do not satisfy the first threshold, or
   temperatures that do not satisfy the second threshold.

8. A method, comprising:

detecting, by a memory device, that data is to be written for a set of temperature profiles;

writing, by the memory device and at respective temperatures corresponding to the set of temperature profiles, multiple copies of the data;

receiving, by the memory device and from a host device, a read request associated with the data;

detecting, by the memory device and based on receiving the read request, a current temperature of the memory device;

reading, by the memory device, a copy, from the multiple copies, that is associated with a temperature profile, from the set of temperature profiles, that corresponds to the current temperature of the memory device; and providing, by the memory device and to the host device, the copy of the data.

9. The method of claim 8, further comprising:
determining that the current temperature corresponds to the temperature profile based on the current temperature:
being included in a range of temperatures associated with the temperature profile,
satisfying a temperature threshold associated with the temperature profile, or
satisfying a first temperature threshold and not satisfying a second temperature threshold.

10. The method of claim 8, further comprising:
receiving updated data associated with the data,
wherein the memory device is associated with a first operating temperature at a time at which the updated data is received; and
writing, based on receiving the updated data, the updated data for the multiple copies of the data at the first operating temperature.

11. The method of claim 10, wherein the first operating temperature is associated with a first temperature profile from the set of temperature profiles, the method further comprising:
detecting that an operating temperature of the memory device has changed from the first operating temperature to a second operating temperature,
wherein the second operating temperature is associated with a second temperature profile;
reading the updated data, from a storage location corresponding to a first copy, from the multiple copies, that is associated with the second temperature profile; and
writing, at the second operating temperature, the updated data for the first copy.

12. The method of claim 8, wherein detecting that the data is to be written for the set of temperature profiles is based on at least one of:
a latency requirement associated with the data,
a command from the host device, or
a logical memory partition associated with the data.

13. The method of claim 8, wherein the set of temperature profiles are defined based on one or more temperature thresholds.

14. The method of claim 8, wherein the data is initialization data or boot data.

15. The method of claim 8, wherein the set of temperature profiles includes a nominal temperature profile, a hot temperature profile, and a cold temperature profile.

16. An apparatus, comprising:
non-volatile memory; and
a controller configured to execute instructions that cause the apparatus to:
detect that data is to be associated with thermal duplication; and
write multiple copies of the data based on detecting that the data is to be associated with the thermal duplication,
wherein the multiple copies of the data are associated with respective temperature profiles, and
wherein the multiple copies are written at temperatures of the apparatus that correspond to the respective temperature profiles.

17. The apparatus of claim 16, wherein the instructions, when executed by the controller, are further configured to cause the apparatus to:
receive, from a host device, a read request associated with the data;
detect a current temperature of the apparatus based on receiving the read request; and
read a copy, from the multiple copies, that is associated with a temperature profile that corresponds to the current temperature of the apparatus.

18. The apparatus of claim 16, wherein the instructions, when executed by the controller, are further configured to cause the apparatus to:
receive an indication of an update indicating updated data associated with the data; and
write, based on receiving the indication of the update, the updated data for the multiple copies of the data in respective storage locations,
wherein the updated data is written for the multiple copies regardless of a temperature of the apparatus when the indication of the update is received.

19. The apparatus of claim 18, wherein the updated data is written for the multiple copies at a first temperature profile, and wherein the instructions, when executed by the controller, are further configured to cause the apparatus to:
monitor an operating temperature of the apparatus;
detect that the operating temperature corresponds to a second temperature profile;
read the updated data from a storage location corresponding to a first copy, from the multiple copies, that is associated with the second temperature profile; and
write, at the operating temperature, the updated data for the first copy.

20. The apparatus of claim 16, wherein the instructions, that cause the apparatus to detect that data is to be associated with the thermal duplication, when executed by the controller cause the apparatus to:
receive, from a host device, an indication that the data is to be associated with the thermal duplication.

* * * * *